May 5, 1931.  K. R. SHAW ET AL  1,803,872
SLEEVE ATTACHMENT FOR ELECTRIC CABLES AND CONDUITS
Filed March 10, 1928
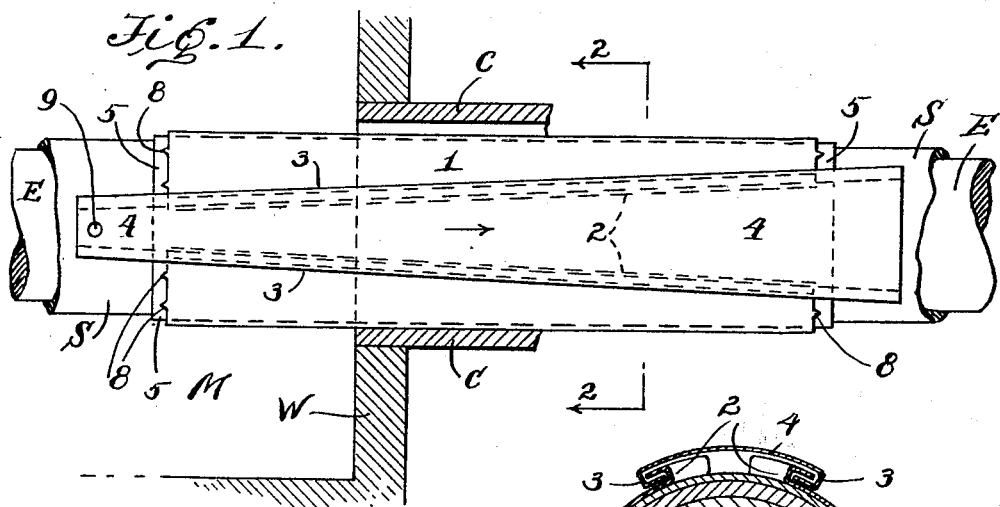
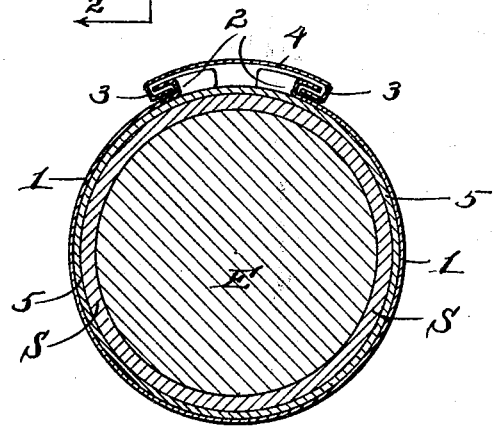
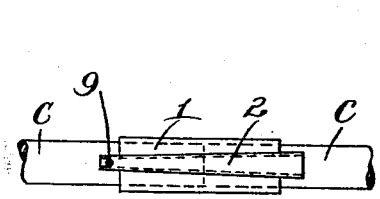
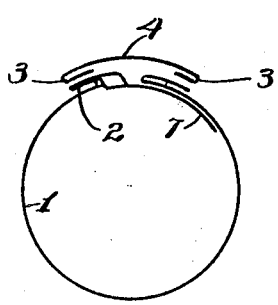
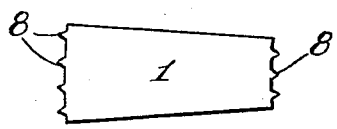
Inventors,
Kenneth R. Shaw and
Philip A. Salmon
By their Attorney Patented May 5, 1931

1,803,872

UNITED STATES PATENT OFFICE

KENNETH R. SHAW AND PHILIP A. SALMON, OF NEWARK, NEW JERSEY

SLEEVE ATTACHMENT FOR ELECTRIC CABLES AND CONDUITS

Application filed March 10, 1928. Serial No. 260,662.

This invention relates to an improved sleeve, forming a protecting shield, coupler, or tightening band, and clamp for cables, pipes, or the like, and means for locking same. One object of same is to provide a device which may be readily applied to electric cables where same emerge from the conduits to protect said cables from damage by contact with the end or edge of the conduit.

A further object is to provide a simple means of locking the shield in position.

It is also an object of this invention to provide a band with a key locking member which is adaptable as a connector or coupler for said conduits or for attaching together the abutting ends of pipes or the like.

A considerable proportion of the failures of electric cables are known to occur where the cable leaves the support of the conduit and hangs in the manhole. This is due to the working of the cable back and forth over the edge of the conduit by longitudinal expansion and contraction. Such a movement results, in the course of time, in abrasion of the sheath and a possible derangement of the internal structure of the cable.

Other devices have been used in the past to protect a cable from structural deterioration of this kind. No device, however, combines the simplicity, ease of application, effectiveness, and rugged construction disclosed and claimed in this application.

In the drawings which form a part of this application—

Figure 1 is a view showing a longitudinal fragment of an electric cable projecting through the end of a conduit into a manhole and shows the protecting shield in place.

Figure 2 is a cross section on line 2—2 of Figure 1.

Figures 3 and 4 are end views of a shield or coupler and show modifications which will be hereinafter fully described.

Figure 5 shows the band applied to two adjacent ends of conduits or pipes; and

Figure 6 is a flattened view of the band.

Referring in detail to the parts, E designates an electric conductor or cable covered, in the usual manner, by a sheath S, and housed within a conduit C which ends in the wall W of a manhole M.

A shield or band 1, of metal or other suitable material, is applied to the cable so that it covers that part which rests against the edge at the end of the conduit. The said band is formed with folds or grooves 2 along its opposite and non-parallel ends which are adapted to engage complementary, interlocking folds or grooves 3 upon a wedge-shaped key or locking member 4.

Between the shield and sheath there is interposed one or more windings or layers 5 of asphalted canvas or other suitable pliant material which is gripped by the prongs 8 on one or both ends of said band 1.

The said locking member or key 4 is employed to draw together the grooved ends of the band and by forcing the key tightly upon the grooves, the band is snugly and securely held around the cable. The key may be secured against accidental displacement by bending the inner end, or by bending the folds into intimate contact, or by upsetting or forcing out of alinement any part of said key and the shield to which same is attached. A perforation 9 upon the said key provides a means for hooking on a pulling instrument, and also provides a means for suspending the cable in vertical runs.

In Figure 3 there is shown a supplementary or auxiliary shield 6 which may be provided and applied directly upon the sheath of the cable or upon the pliant band against the sheath.

Figure 4 shows a form in which an end 7 of the shield 1 is extended to close the gap between the grooved edges, and is particularly applicable for connecting abutting ends of conduits, pipes, and the like.

In Figure 5 the band 1 is shown in use as a coupler for joining the ends of two sections of conduits or pipes C.

Various modifications may be employed without departing from the spirit or scope of this invention and it is therefore not intended to limit same to the particular embodiment shown.

What is claimed:

1. A split, flexible sleeve having tapered and grooved edges and adapted to encircle an electric cable, and a closing member having tapered and grooved edges adapted to co-act with the said tapered and grooved edges upon said flexible sleeve to hold and lock said sleeve upon said cable to protect same against abrasion from contacting parts.

2. The device of claim 1, including a band of pliant material interposed between the said cable and said sleeve and prongs formed upon said sleeve to engage said pliant band.

3. A coupler for conduits, pipes, tubes, and the like, comprising a split transversely contractible sleeve having tapered and grooved edges and adapted to encircle the abutting ends of adjacent conduits, and a keystone-shaped closing member having tapered and grooved longitudinal edges adapted to co-act with said tapered and grooved edges upon said sleeve and when moved longitudinally thereon in one direction to contract the same around abutting ends of said conduits.

4. A split transversely contractible sleeve having tapered and grooved edges and adapted to encircle electric cables and the like and adjoined pipe sections and the like, a rigid keystone shaped closing member having tapered and grooved longitudinal edges adapted to coact with said tapered and grooved sleeve edges to contract said sleeve, and said closing member having a perforation adjacent one end adapted to serve both as means to manipulate said closing member as well as means to suspend the sleeve and the cable or pipe sections embraced thereby to support the latter in desired vertical or angular positions.

KENNETH R. SHAW.
PHILIP A. SALMON.